M. SCHNAIER.
MIXING VALVE.
APPLICATION FILED APR. 6, 1914.
1,210,105.
Patented Dec. 26, 1916.
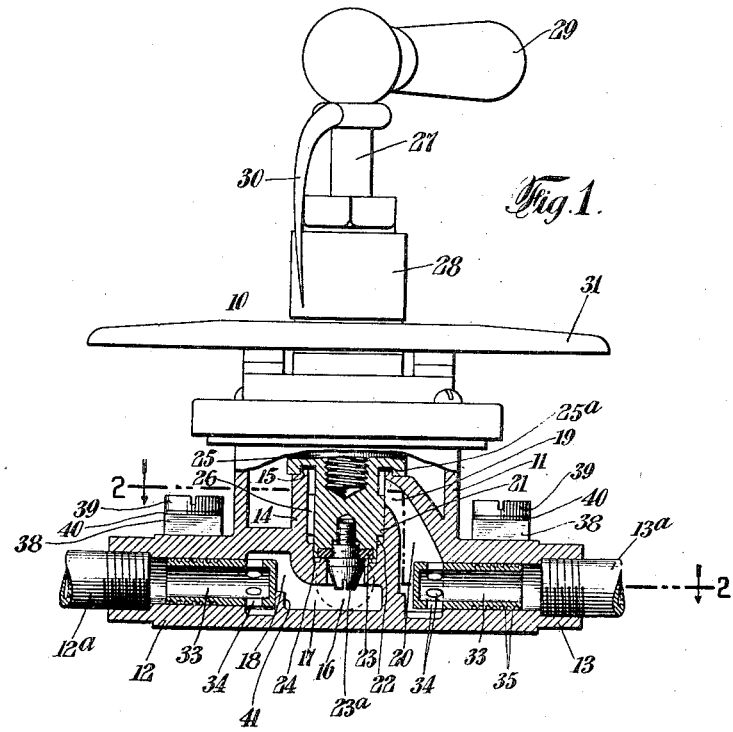
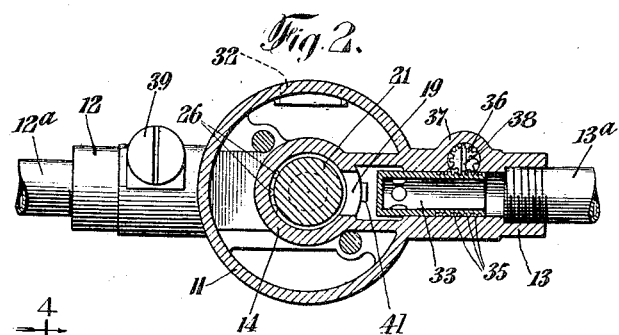
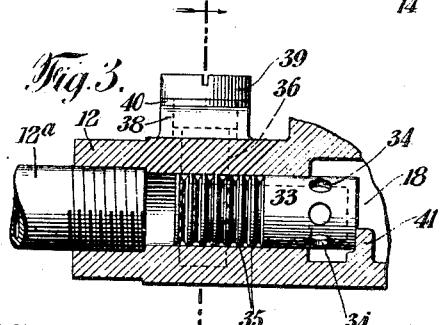
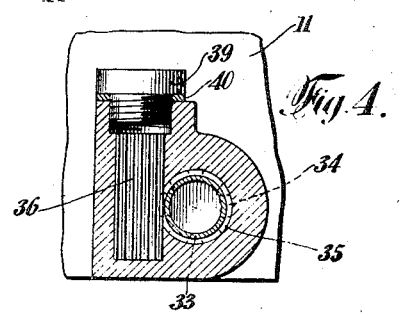
Witnesses:
John E. Kruger
A. Worden Gibbs
Inventor
Milton Schnaier
BY Conrad A. Dietrich
his ATTORNEY.

UNITED STATES PATENT OFFICE.

MILTON SCHNAIER, OF NEW YORK, N. Y., ASSIGNOR TO MILTON SCHNAIER CONTRACTING CORP., A CORPORATION OF NEW YORK.

MIXING-VALVE.

1,210,105.  Specification of Letters Patent.  Patented Dec. 26, 1916.

Application filed April 6, 1914. Serial No. 829,874.

*To all whom it may concern:*

Be it known that I, MILTON SCHNAIER, a citizen of the United States, residing at the city of New York, borough of Manhattan, in the county and State of New York, have invented certain new and useful Improvements in Mixing-Valves, of which the following is a full, clear and exact specification.

My invention relates to improvements in means for controlling the flow of fluids, and the same has for its object more particularly to provide a simple, efficient and reliable valve for shower baths and other apparatus by means of which the quantities of the several fluids entering said valve may be positively controlled or regulated in order properly to mix the same.

Further, said invention has for its object, to provide a valve for positively and uniformly mixing fluids which may be received from sources of supply, maintained or stored at different levels, or under different pressures.

Further, said invention has for its object, to provide a valve for use in connection with shower baths, bath tubs or other apparatus or fixtures by means of which hot and cold water received from common sources of supply may be positively controlled in order to insure a duly proportioned mixture thereof at each and every valve regardless of its position relative to such sources of water supply.

To the attainment of the aforesaid objects and ends, my invention consists in the novel details of construction, and in the combination, connection and arrangement of parts hereinafter more fully described and then pointed out in the claims.

In the accompanying drawings, wherein like numerals of reference indicate like parts—Figure 1 is a side view, partly in section, showing one form of valve construction according to, and embodying my said invention, Fig. 2 is a transverse section taken on the line 2—2 of Fig. 1; Fig. 3 is an enlarged detail longitudinal sectional view of one of the inlet portions of the valve and the regulating means arranged therein, and Fig. 4 is a transverse section thereof taken on the line 4—4 of said Fig. 3.

In said drawings 10 designates a mixing valve comprising a casing 11 forming a mixing chamber which for convenience is shown as of circular outline. At the left hand side of said casing is provided an inlet nipple 12 which is connected by a pipe 12$^a$ with a source of hot water supply, and at the opposite side of said casing is provided an inlet nipple 13 which is connected by a pipe 13$^a$ with a source of cold water supply. Within said casing 11 is centrally arranged a cylindrical casing portion or member 14 which is open at its top and forms a valve seat 15 at its upper edge. The lower portion of said cylindrical member 14 has its inner diameter constructed to form an inlet portion 16 communicating, through an opening 17, with an inlet compartment 18 extending from the hot water inlet nipple 12. The opposite side of said cylindrical member 14 is provided adjacent to its upper edge with an opening 19 communicating with an inlet compartment 20 extending from the cold water inlet nipple 13.

Within the cylindrical member 14 works a valve member in the form of a piston or plug 21 having a reduced lower end 22, upon the under side of which is disposed a washer 23 secured in place thereon by a screw 23$^a$ having a tapering or conical head. The under side of said plug and the washer 23 thereon is adapted to seat upon the valve seat 24 provided at the upper edge of the reduced portion of said cylindrical member 14, in order to control the admission of hot water to the casing 11. The body portion of said valve or plug 21 fits snugly within the cylindrical member 14 but is free to move vertically therein, and is provided at its upper end with a head 25 adapted to seat upon the upper end of said cylindrical member 14. The body portion of said valve or plug 21 is provided with a plurality of vertical grooves 26, 26, which permit of the hot water admitted at the base of said cylindrical member 14 to pass by said valve when the lower end thereof and said washer 23 are raised from the seat 24 and permit the fluid to pass out of the upper end of said cylindrical member 14 and into the outer casing 11. The underside of the head 25 may be provided with a suitable packing or gasket 25ª.

The valve 21 is carried upon the lower end of a spindle or stem 27 whose upper end extends through the top of the valve casing and through a stuffing box 28, and is provided with an operating handle 29 and a pointer 30 to indicate upon a face plate 31 the extent to which the valve has been opened. Any suitable means may be provided for preventing the valve rotating as it is raised or lowered.

32 denotes an outlet nipple communicating with the interior of the outer casing 11, and having its outer end connected with a pipe, not shown, extending to the bath fixture, faucet or other device through which the fluid is to be finally discharged.

In order to insure the proper mixing of hot and cold water within each mixing valve, I provide each of the inlet nipples 12, 13 with a longitudinally movable regulating member 33 which is open at its entrance end and closed at its opposite end, and provided in its side adjacent to its closed inner end with a plurality of apertures 34, 34. The said movable member 33 is provided at its outer end with a series of annular ribs 35 forming a rack which is engaged at one side by a pinion 36 vertically supported in an off-set portion or housing 37 provided at the side of the nipple. The upper end of the pinion 36 is provided with a slot 38 to receive the end of a screw driver or other suitable tool whereby said pinion may be rotated and the movable member 33 moved inward or outward to uncover more or less of the apertures 34, 34 therein, and thus positively and definitely control the volume of water permitted to enter the casing 11 through the nipple within which said member 33 is disposed.

In order to prevent any leakage of water past the pinion 36, and to protect the same, the upper end of each offset portion or housing 37, above the upper end of the pinion 36 therein, is screw-threaded to receive a cap screw or plug 39 provided with a washer 40.

In order to limit the inward movement of the regulating members 33, 33 the same may be provided with stops 41, 41.

The operation of the valve generally will be understood from the foregoing. In order to properly control the mixture of hot and cold water where the pressures thereof at the entrance to the casing 11 are not the same, it merely becomes necessary to remove the screw caps or plugs 39, 39 and rotate the pinions 36, 36, whereby the regulating members 33, 33 may be moved inward or outward to the required extent to uncover enough of the apertures 34, 34 to insure the passage of the proper volume of water according to the pressure thereof.

It will be observed that by means of my invention I am enabled to insure the admission of the exact amount of water to any number of valves as may be necessary to produce the desired mixture of water and that this can be accomplished regardless of the positions of such valves relative to the source of water supply, or of the pressure at which the water may be severally supplied to said valves.

Further, it will be noted that when the regulating members are once adjusted, the same will be automatically held to their adjusted positions without necessitating the providing of separate means for that purpose.

Having thus described my said invention, what I claim and desire to secure by Letters Patent is—

1. A valve comprising a casing provided with an inlet passage and an outlet, a valve member within said casing to control the flow of fluid from said inlet passage through said casing to said outlet, a hollow longitudinally-movable regulating member disposed within said passage, said regulating member having a closed inner end and having openings in its side adjacent said closed end, said regulating member being provided adjacent its outer end with a plurality of circumferential annular ribs forming a rack, and a pinion rotatably mounted upon said casing and engaging said rack whereby said regulating member may be moved back and forth in a longitudinal direction to cause said openings to be moved into and out of register with the wall of said inlet passage to control the volume of fluid admitted through said passage, substantially as specified.

2. A valve comprising a casing provided with an inlet passage and an outlet, a valve member within said casing to control the flow of fluid from said inlet passage through said casing to said outlet, a longitudinally-movable regulating member disposed within said inlet passage to control the volume of fluid admitted therethrough, said regulating member being provided adjacent its outer end with a plurality of circumferential annular ribs forming a rack, and a toothed member rotatably mounted upon said casing and engaging said rack whereby said regulating member may be moved back and forth within said inlet passage, substantially as specified.

3. A valve comprising a casing provided with a plurality of inlet passages and an outlet, a valve member within said casing to control the flow of fluid from said inlet passages through said casing to said outlet, each of said inlet passages having disposed therein a regulating member to control volume of fluid admitted therethrough, and independent means operatively connected to each of said regulating members for positively actuating the same, whereby the volumes of fluid admitted to the casing through said inlet passages may be controlled to insure a proper mixture thereof, substantially as specified.

Signed at the city of New York, in the county and State of New York, this 31st day of March, one thousand nine hundred and fourteen.

MILTON SCHNAIER.

Witnesses:
   CONRAD A. DIETERICH,
   JOSEPH G. QUINN, Jr.